US007974272B2

(12) United States Patent
Chang et al.

(10) Patent No.: US 7,974,272 B2
(45) Date of Patent: Jul. 5, 2011

(54) REMOTE CONTROL OF A SWITCHING NODE IN A STACK OF SWITCHING NODES

(75) Inventors: Rong-Feng Chang, Irvine, CA (US); Mike Twu, Yorba Linda, CA (US); Craig Barrack, Irvine, CA (US); Allen Yu, San Simas, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1595 days.

(21) Appl. No.: 10/901,873

(22) Filed: Jul. 29, 2004

(65) Prior Publication Data

US 2006/0023640 A1 Feb. 2, 2006

(51) Int. Cl.
*H04Q 11/00* (2006.01)
*H04L 12/56* (2006.01)

(52) U.S. Cl. .......................... 370/360; 370/396; 370/400

(58) Field of Classification Search .................. 370/400, 370/392, 396, 360, 236, 462
See application file for complete search history.

(56) References Cited

U.S. PATENT DOCUMENTS

| | | | | |
|---|---|---|---|---|
| 6,324,644 B1 * | 11/2001 | Rakavy et al. | ..................... | 713/1 |
| 6,674,727 B1 * | 1/2004 | Carroll et al. | .................. | 370/254 |
| 6,785,272 B1 * | 8/2004 | Sugihara | ........................ | 370/386 |
| 6,868,086 B1 * | 3/2005 | Putzolu et al. | ................ | 370/401 |
| 6,954,437 B1 * | 10/2005 | Sylvest et al. | ................ | 370/256 |
| 6,999,452 B1 * | 2/2006 | Drummond-Murray et al. | ............................. | 370/389 |

(Continued)

FOREIGN PATENT DOCUMENTS

CN 1422474 6/2003

(Continued)

OTHER PUBLICATIONS

D. Harrington, "RFC 2571: An Architecture for Describing SNMP Management Frameworks," Apr. 1999, Network Working Group, p. 1-62.*

(Continued)

*Primary Examiner* — Dang T Ton
*Assistant Examiner* — Ryan Kavleski
(74) *Attorney, Agent, or Firm* — Thomas, Kayden, Horstemeyer & Risley, LLP

(57) ABSTRACT

A methods and apparatus for remote management of switching network nodes in a stack via in-band messaging are presented. Switching nodes in the stack default to reserved switching node identifiers and stacking ports default to a blocking state upon startup, restart, and reset. Each command frame received via a blocking state is forwarded to a command engine at each switching node and is acknowledged with the current switching node identifier. Each acknowledgement frame bearing the reserved network node identifier triggers configuration of the acknowledging switching node. Switching nodes and the management processor track interrupt state vectors regarding events. An interrupt acknowledgement process is employed to track raised interrupts. Configuration of switching node is performed via command frames transmitted by the management processor and destined to a command engine associated with the switching node. Services provided by the management processor are requested via control frames destined to the switching node to which the management processor is attached and destined to the management port thereof. The advantages are derived from engineered switching node deployments wherein an appropriate number of management processors, less than the number of switching nodes in the stack, are employed to provide services to corresponding switching nodes in the stack, based on processing, control, and configuration bandwidth requirements. The in-band configuration and control of the switching nodes in the stack reduce deployment, configuration, management, and maintenance overheads.

17 Claims, 9 Drawing Sheets

U.S. PATENT DOCUMENTS

| | | | |
|---|---|---|---|
| 7,123,615 B2 * | 10/2006 | Weyman et al. | 370/389 |
| 7,177,946 B1 * | 2/2007 | Kaluve et al. | 709/242 |
| 2002/0046271 A1 * | 4/2002 | Huang | 709/223 |
| 2002/0103945 A1 * | 8/2002 | Owen et al. | 710/10 |
| 2003/0037162 A1 * | 2/2003 | Kotser | 709/236 |
| 2003/0185152 A1 * | 10/2003 | Nederveen et al. | 370/229 |
| 2003/0189924 A1 | 10/2003 | Kadambi et al. | |
| 2003/0193891 A1 * | 10/2003 | Chen et al. | 370/217 |
| 2004/0190517 A1 * | 9/2004 | Gupta et al. | 370/392 |
| 2004/0199667 A1 * | 10/2004 | Dobbins | 709/240 |
| 2005/0036488 A1 * | 2/2005 | Kalkunte et al. | 370/389 |
| 2005/0166267 A1 * | 7/2005 | Pietilainen et al. | 726/23 |

FOREIGN PATENT DOCUMENTS

| | | |
|---|---|---|
| WO | WO01/77849 | 10/2001 |

OTHER PUBLICATIONS

First Foreign Office Action for DE102005032479.7-31 mailed Jan. 29, 2009.
Second Foreign Office Action for DE102005032479.7-31 mailed Jan. 11, 2010.
First Office Action for CN20051088804.2 mailed Jan. 18, 2008.
Second Office Action for CN20051088804.2 mailed Aug. 29, 2008.
Third Office Action for CN20051088804.2 mailed Jan. 16, 2009.
Fourth Office Action for CN20051088804.2 mailed Jun. 5, 2009.
First Office Action for JP2005-219529 mailed Mar. 4, 2008.
Second Office Action for JP2005-219529 mailed Jun. 24, 2008.

* cited by examiner

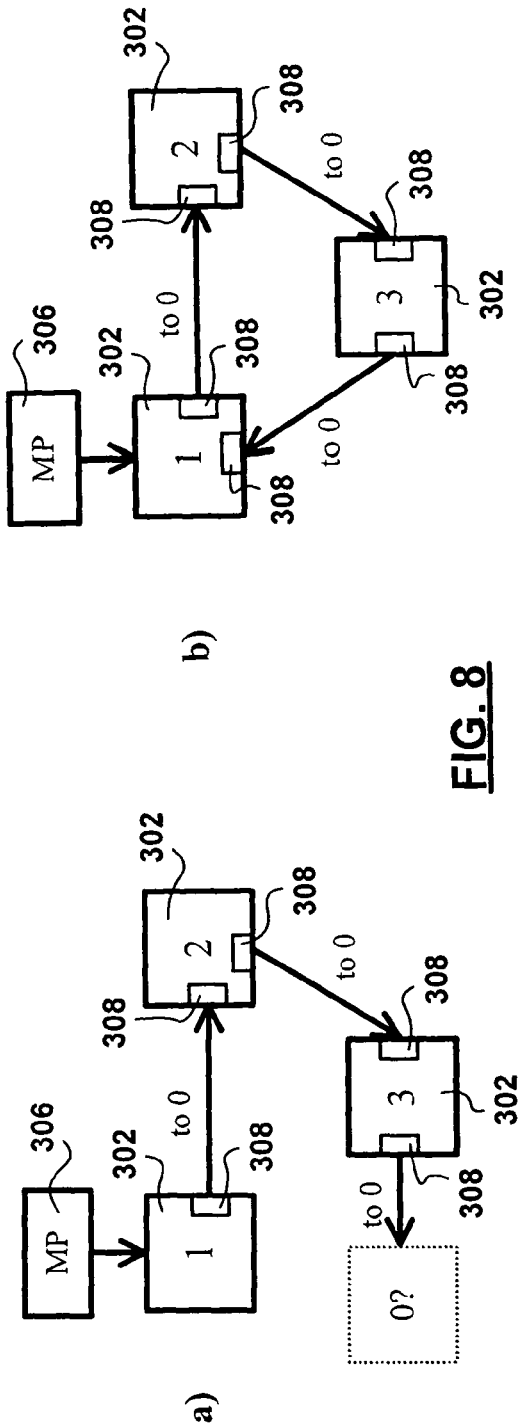
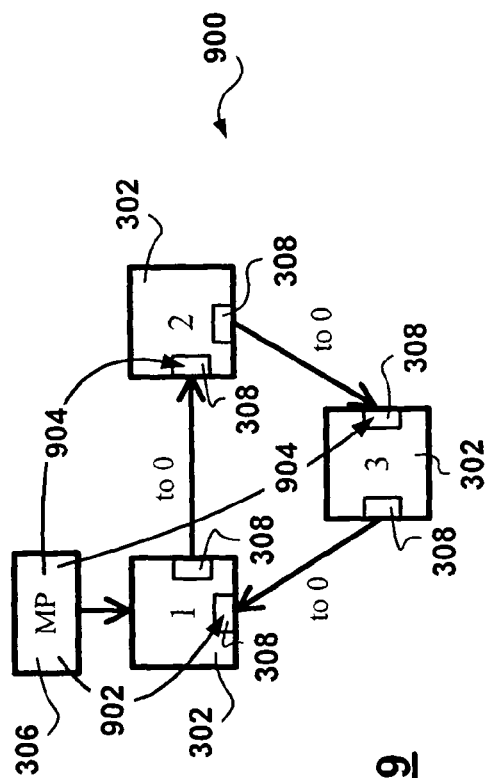
FIG. 8
FIG. 9

REMOTE CONTROL OF A SWITCHING NODE IN A STACK OF SWITCHING NODES

FIELD OF THE INVENTION

The invention relates to switching network node control in communication networks, and in particular to methods of controlling multiple switching network nodes in a stack, wherein only a few switching network nodes in the stack have a management processor attached thereto.

BACKGROUND OF THE INVENTION

In the field of packet-switched communications, switching network nodes are employed to direct packet traffic to appropriate network destinations. Switching network nodes may operate in a managed mode in which the switching node employs the services of a management processor, or may operate in an unmanaged mode in which the switching node operates on its own. Both modes of operation are desired as in the managed mode the management processor provides, for example, learning functionality for the switching node, while the related management overhead is not incurred in the unmanaged mode. During normal operation, main sources of traffic to and from the management processor include: data packets that cannot be parsed by hardware classification or packets that require special software support; hardware-triggered interrupts including statistics counter rollovers; insertions or deletions from the Media Access Control (MAC) address lookup table; or warnings about resource availability. There are costs associated with the development, implementation, deployment, and management of the management processor itself.

Various related solutions, described elsewhere, address issues related to management processor optimization and management overhead reductions.

One of the switching network node deployment scenarios includes stacking multiple switching network nodes typically co-located in a single equipment shelf.

A switch stack is a configuration of a group switching network nodes which collectively behave as a single logical switching network node while providing a higher aggregate throughput. For example, suppose that a single network switch 102 contains 24 Fast Ethernet ports and 4 Gigabit Ethernet ports. Although network switch 102 supports up to 6.4 Gbps, as illustrated in FIG. 1, cascading multiple such network switches 102 can increase the aggregate system throughput. The staking configuration 100 shown in FIG. 1a) delivers an aggregate throughput of 13.2 Gbps with three switching nodes 102 deployed in a ring configuration 104. The stacking configuration 110 shown in FIG. 1b) delivers an aggregate throughput of 22.4 Gbps with six switching nodes 102 deployed in a dual ring configuration (104). And, the stacking configuration 120 shown in FIG. 1c) delivers an aggregate throughput of 17.6 Gbps with three switching nodes 102 deployed in a star configuration.

Although the increase in aggregate throughput makes stacking deployments highly desirable, it suffers from a difficulty of configuring and controlling the switching nodes 102 that in such a stack.

FIG. 2 illustrates prior art managed switching node deployments. The deployment 200 illustrated in FIG. 2a), shows each switching node 102 having an individual management processor 204 controlling thereof. While this is a simple approach it is also costly. The deployment 210 illustrated in FIG. 2b), shows the entire switching node stack being controlled by a single management processor 206. In accordance with this approach, the management processor 206 is said to enable control and configuration for the single domain defined by the switching nodes 102 in the stack. The management processor 206 sends signals or messages to all the switching nodes 102 in the stack via a separate control plane 208, usually implemented as a shared medium. As is apparent from FIG. 2a) and FIG. 2b) each switching node 102 reserves a dedicated port for retaining services of the management processor 204/206 and the shared management processor deployment 210 suffers from an overhead incurred in deploying, configuring, managing, and maintaining the shared medium 208.

There therefore is a need to solve the above mentioned issues in providing switching node control and configuration in a stack of switching nodes.

SUMMARY OF THE INVENTION

In accordance with an aspect of the invention, a switching network node of a multitude of switching network nodes participating in a switching network node stack is provided. The switching node includes: at least one stacking port for exchanging frames with at least one other switching node in the stack, a switching node identification register specifying the switching node identification of the switching node, a management node identification register specifying the switching node identifier of the switching node of the plurality of switching nodes in the stack to which a management processor is attached, and a forwarding table for specifying, for each switching node in the stack, a corresponding stacking port via which to forward frames towards said switching node.

In accordance with another aspect of the invention, a management processor for remote management of a plurality of switching network nodes in a stack is provided. The management processor includes: means for identifying a received a control frame; means for acknowledging the received control frame; a repository for tracking switching node states; means for encapsulating a command in generating a control frame; and transmission means for forwarding generated control frames.

In accordance with a further aspect of the invention, a method of discovering a plurality of switching network nodes in a stack of switching network nodes, where each switching network node in the stack has a switching node identifier specifying a reserved identification value and at least one stacking port configured to forward all command frames to a command engine in a blocking state and to forward command frames in accordance with switching information specified in a forwarding table in a forwarding state, is provided. Method steps performed by the switching node include: receiving, via a stacking port configured in the blocking state, a command frame destined for a switching node having the reserved identification value; forwarding the command frame to the command engine; acknowledging the command frame with the switching node identifier; setting the switching node identifier to a new value specified in a received command frame encapsulating a command specifying changing the switching node identifier to a value different from the reserved value; and forwarding subsequent command frame destined for a switching node having the reserved identification value received via a stacking port configured in the forwarding state in accordance with the switching information specified in the forwarding table.

In accordance with a further aspect of the invention, a method of discovering a plurality of switching network nodes in a stack of switching network nodes, where each switching network node in the stack has a switching node identifier specifying a reserved identification value and at least one stacking port configured to forward all command frames to a command engine in a blocking state and to forward command frames in accordance with switching information specified in a forwarding table in a forwarding state, is provided. Cyclical method steps method steps performed by the management processor include: transmitting a command frame specifying a destination switching node having the reserved identification value; receiving an acknowledgement form the switching node specifying the reserved identification value from the newly discovered switching node; configuring the switching node identifier of the newly discovered switching node to a unique identification value different from the reserved identification value; retrieving stacking port identifiers from the newly discovered configured switching node; selecting a stacking port; and setting the selected stacking port in the forwarding state.

In accordance with a further aspect of the invention, a method of providing management processor services to a switching network node in a stack of switching network nodes is provided. The method includes: encapsulating data concerning the service provided into a frame; associating a frame stacking tag (FTAG) with the frame; writing the switching node identifier of the switching node to a destination switching node field of the FTAG; transmitting the frame bearing the FTAG towards the switching node.

In accordance with yet another aspect of the invention, a method of processing frames at switching network node in a stack of switching network node is provided. The method includes: selectively forwarding a received frame based on switching information stored in a switching database associated with the switching node if the received frame bears a classification action value other than a classification action value reserved for control frames; selectively forwarding a received frame based on switching information stored in a forwarding table associated with the switching node if the received frame bears a classification action value reserved for control frames; and selectively changing the classification action value of a frame to the classification action value reserved for control frames for each frame requiring management processor services.

The advantages are derived from engineered switching node deployments wherein an appropriate number of management processors, less than the number of switching nodes in the stack, are employed to provide services to corresponding switching nodes in the stack, based on processing, control, and configuration bandwidth requirements. The in-band configuration and control of the switching nodes in the stack reduce deployment, configuration, management, and maintenance overheads.

BRIEF DESCRIPTION OF THE DRAWINGS

The features and advantages of the invention will become more apparent from the following detailed description of the exemplary embodiment(s) with reference to the attached diagrams wherein:

FIGS. 8a and b are a schematic diagrams showing initialization of switching network nodes in a stack having a ring configuration and a looping of discovery control frames;

FIG. 9 is a schematic diagram showing, in accordance with the exemplary embodiment of the invention, control frame loop detection.

It will be noted that in the attached diagrams like features bear similar labels.

DETAILED DESCRIPTION OF THE EMBODIMENTS

Figure 1:
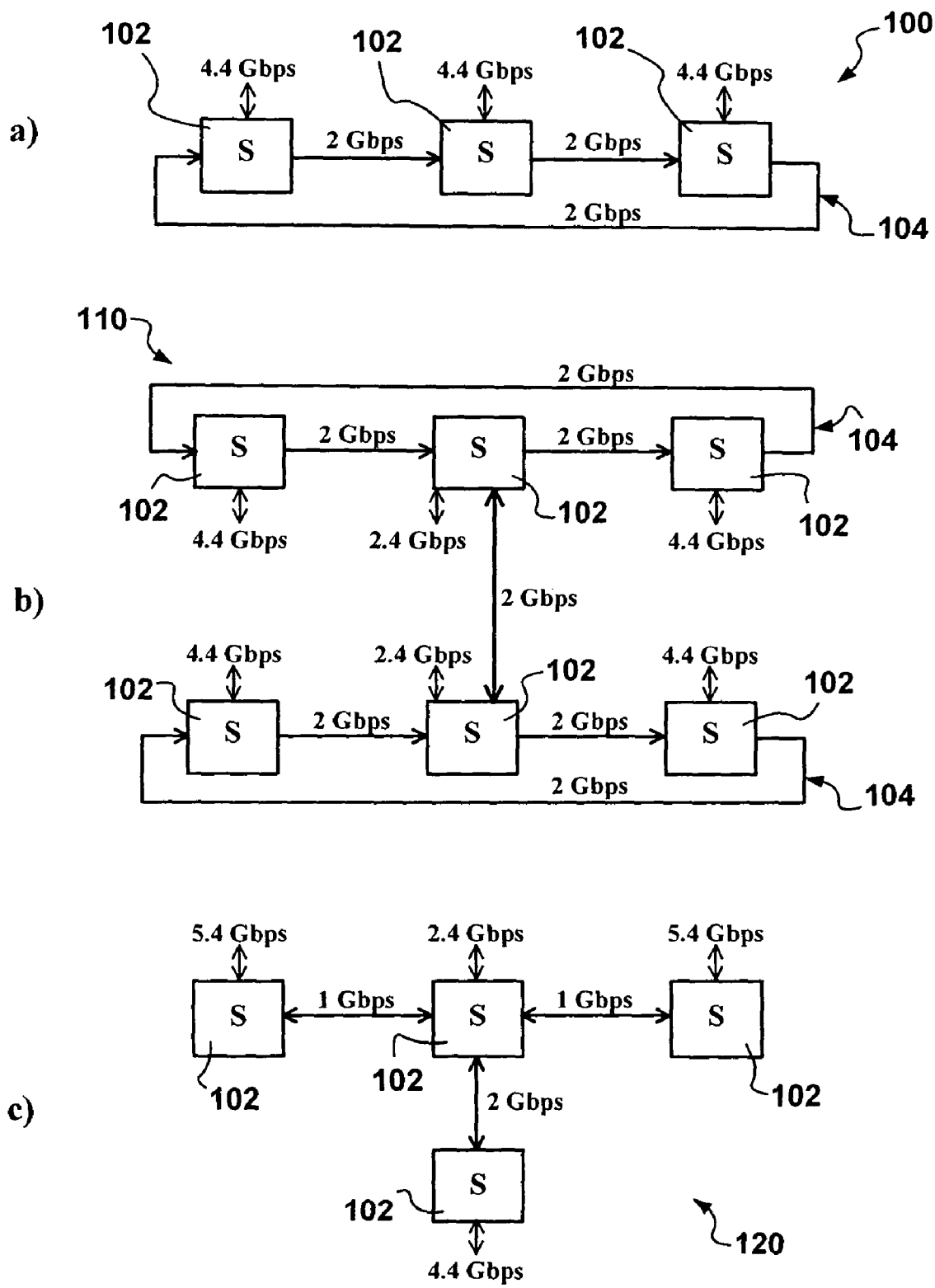
FIGS. 1a, b and c are a schematic diagrams showing exemplary switching node stacking deployments providing increased aggregate throughput.
Figure 2:
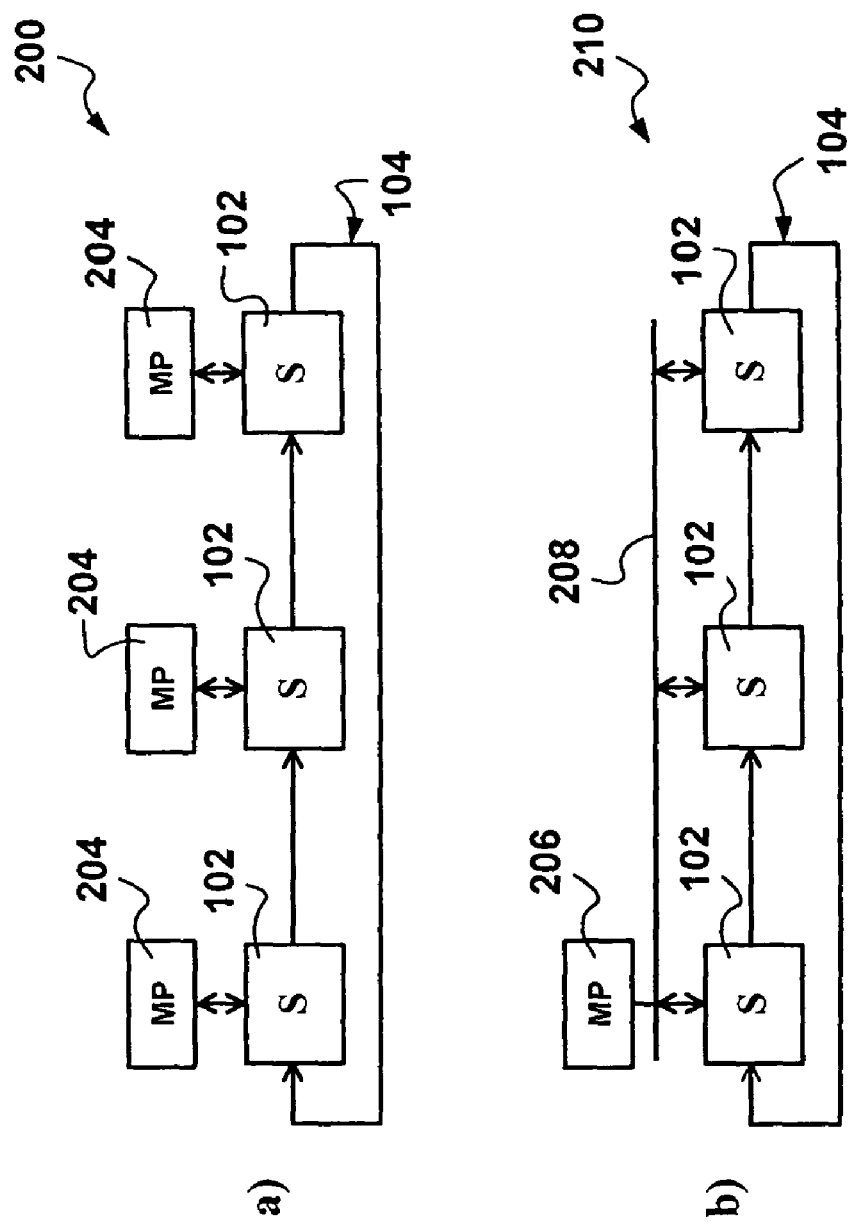
FIGS. 2a and b are a schematic diagrams showing prior art managed switching node staking deployments.
Figure 3:
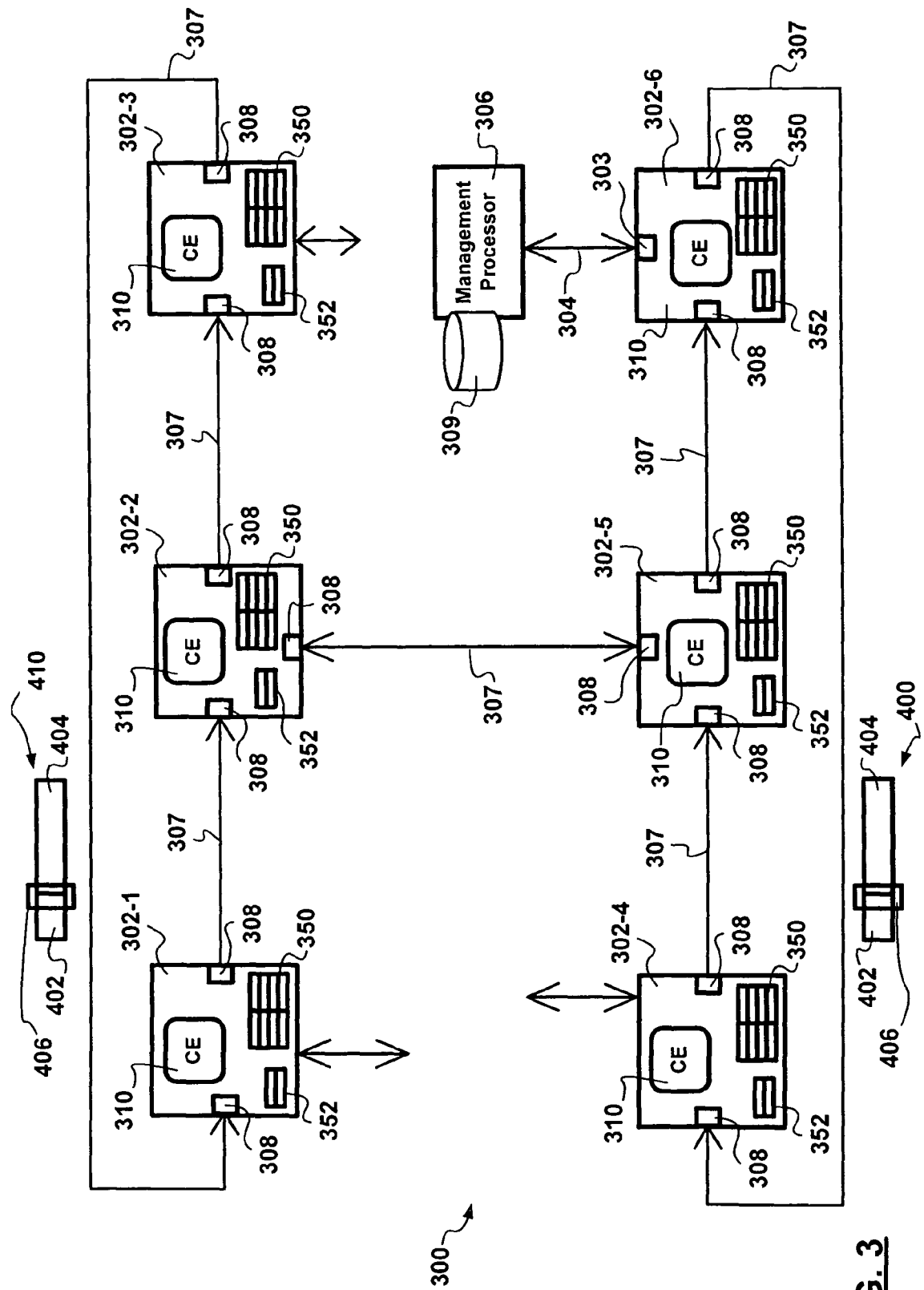
FIG. 3 is a schematic diagram showing elements implementing remote switching node control in a switching node stack, in accordance with the exemplary embodiment of the invention.

Making reference to FIG. 3, in accordance with an exemplary embodiment of the invention, network switches 302 in a stack 300 are configured and controlled by a management processor 306 connected 304 to one of the switching network nodes 302 without deploying a separate management processor for each switching network node 302 in the stack 300. The approach presented herein is referred to as a remote configuration and control of switching nodes 302 in a stack 300.

Exemplary elements of a remote configuration and control deployment in a stacking configuration include links interconnecting switching nodes 302 referred to as stacking links 307 connecting stacking ports 308.

In accordance with the exemplary embodiment of the invention, each frame 400 transmitted from via a stacking port 308 includes a Frame stacking TAG (FTAG) 406, having the following exemplary format:

| Field | Field Description |
|---|---|
| Classifier action | 0 - Normal L2/L3 search. |
| | 1 - Flow-based table lookup. Use flow field. |
| | 2 - Packet to management processor, or packet from the management processor with single destination. Use destination switching node field to determine if destination switching node is remote. If remote, use destination switching node/stacking port table to determine an egress port. Otherwise, forward to a local port or local command engine based on the group ID field. |
| | 3 - Packet from the management processor with multiple destinations. Use group ID field to determine egress port or ports. |
| Destination OR Flow ID OR | Switching node ID and port ID to which the packet is destined OR Flow ID |

-continued

| Field | Field Description |
|---|---|
| Group ID | OR Multicast group ID. |
| Original source | Switching node ID and port ID from which the packet originated in the stack. |
| Flow control enable | Indicates that the packet's original source port is flow control enabled. |
| Transmission priority | Transmission priority of the packet, used for queuing and scheduling. |
| Drop precedence | Discard priority of the packet, used for WRED prior to queuing. |
| Use priority bits | Indicates that the priority bits stored in the FTAG override any other means of determining a packet's priority. |
| VLAN | Two byte tag, including user priority bits, CFI, and VLAN ID. |
| VLAN tag in | Indicates that the packet contains a VLAN tag header. |
| Override VLAN action | Indicates that no VLAN action (insertion, stripping, replacement) may be performed on this packet. |
| Multicast | Indicates whether the packet is a multicast packet. |
| FTAG signature | These bits are typically set to "FF". |

The size of the FTAG 406 correlates with the overhead incurred by such an implementation, the size of the FTAG 406 used is left to design choice, which for each deployment is a balance between the incurred overhead and the supported functionality.

Each FTAG 406 contains information about a processed frame, including, for example, whether the frame is unicast or multicast, a transmission priority, a VLAN association, the original "source"—the switching node 302 and external port via which the frame 400 was first received, etc. As will be described in more detail below, a classifier action field determines for each frame 400 where will the frame 400 be forwarded by each switching node 302 in the stack 300.

In accordance with the exemplary embodiment of the invention, although most frames conveyed via a stacking port 308 will indeed include an FTAG 406, MAC flow control frames are one exception. Therefore, an FTAG signature is needed to distinguish frames including an FTAGs 406 from those few that do not. Such an FTAG signature exemplary identifies the first number of bits/bytes following the preamble as an FTAG, rather than actual frame data 404. The FTAG 406 and the FTAG signature may be associated with the frame header 402 without limiting the invention thereto.

In accordance with the exemplary embodiment of the invention, each switching node 302 in the stack 300 includes a command engine 310. Exemplary functionality of the command engine 310 includes: decoding command frames 410 received from the management processor 306, executing the commands contained therein, and generating an acknowledgment and/or response. If the management processor 306 is "remote,"—that is, not directly attached to the subject switching node 302—then the command engine 310 acts as the local surrogate of the management processor 306, configuring the switching network node 302 logic and responding the remote control effected. Additionally, the command engine 310 can initiate outgoing command frames 410, in order to interrupt the remote management processor 306 when services and/or support are needed. The following table shows an exemplary format of such an exemplary command frame 410:

| Field | Details |
|---|---|
| Destination MAC ADDR | Destination MAC address of the command frame. |
| Source MAC ADDR | Source MAC address of the command frame. |
| Ethertype | Always set to A0A0 to signify that this is a command frame. |
| Sequence number | Creates a reliable channel for remote control by monitoring loss of command frames. |
| Control frame information | If the command frame is an interrupt to the CPU, indicates the interrupt thread ID. Management processor or command engine. If 0, indicates that the management processor issued the frame. If 1, indicates that the command engine issued the frame. Device ID: For a frame originating from the management processor, indicates the frame's destination device (switching network node/port ID). For a frame intended for the management processor, indicates the frame's source device (switching node/port). |
| Command opcode | If the frame is a response, setting this bit to 1 indicates that the original command was invalid or unexecutable. Otherwise, indicates the type of command/response. |
| Data | Content of the command/response. |

The opcode of a command frame 410 is used to identify the type of command or response that is encoded in the frame data 404. Sample command opcodes are listed, although the variety of remote commands/requests that may be employed in a particular implementation is virtually unlimited:

| Opcode | Definition |
|---|---|
| 000001 | Memory read request from management processor, or response. |
| 000010 | Memory write request from management processor, or acknowledgment. |
| 000011 | Register write request from management processor, or acknowledgment. |
| 000100 | Register read request from management processor, or response. |
| 000101 | Request from management processor to insert MAC ADDR into table, or acknowledgment. |
| 000110 | Request from management processor to look up MAC address in table, or response. |
| 000111 | Request from management processor to delete MAC address from table, or acknowledgment. |
| 001000 | Command engine alerts management processor of statistics counter rollover. |
| 001001 | Command engine alerts management processor about queue occupancy. |
| 001010 | Command engine alerts management processor of link failure/fail-over. |
| 001011 | Command engine alerts management processor that MAC address has been inserted into table. |
| 001101 | Command engine alerts management processor that MAC address has been deleted from table. |

The actual frame data 404 content of a command frame 410 varies depending on the opcode of the command frame 410. For example, the content of a command frame 410 opcode "000011" (register write request) includes the addresses of the registers to be written, and the associated values. By contrast, the content of a command frame 410 with opcode "001000" (statistics counter rollover) contains a bitmap of all the hardware statistics counters in the switching node 302 which originated the command frame 410, with a logic high "1" in only those bit locations for which counters have wrapped around.

In accordance with the exemplary embodiment of the invention, each switching node 302 in the stack 300 includes a forwarding table 350, exemplary illustrated below for switching node 302-2 in the stack 300:

| Destination Switch 302 | Stacking Port 308 |
|---|---|
| 1 | B |
| 2 | X (self) |
| 3 | B |
| 4 | D |
| 5 | D |
| 6 | D |

At every switching node 302 in the stack 300, the local forwarding table 350 stores the stacking port IDentifier via which a frame 400/410 must be forwarded in order to reach another switching node 302 in the stack 300.

In accordance with the exemplary embodiment of the invention, in addition to the forwarding table 350, each switching node 302 in the stack 300 also stores its own unique ID, as well as the ID of the switching node 302 to which its controlling management processor 306 is directly attached to. This information is typically stored in local registers 352.

In accordance with the exemplary embodiment of the invention, the above mentioned elements cooperate to enable in-band control frame transport in a switching node stack 300 subject to the remote control is being applied.

In accordance with a first exemplary scenario the management processor 306 generates a command for a remote switching node 302.

Figure 4:
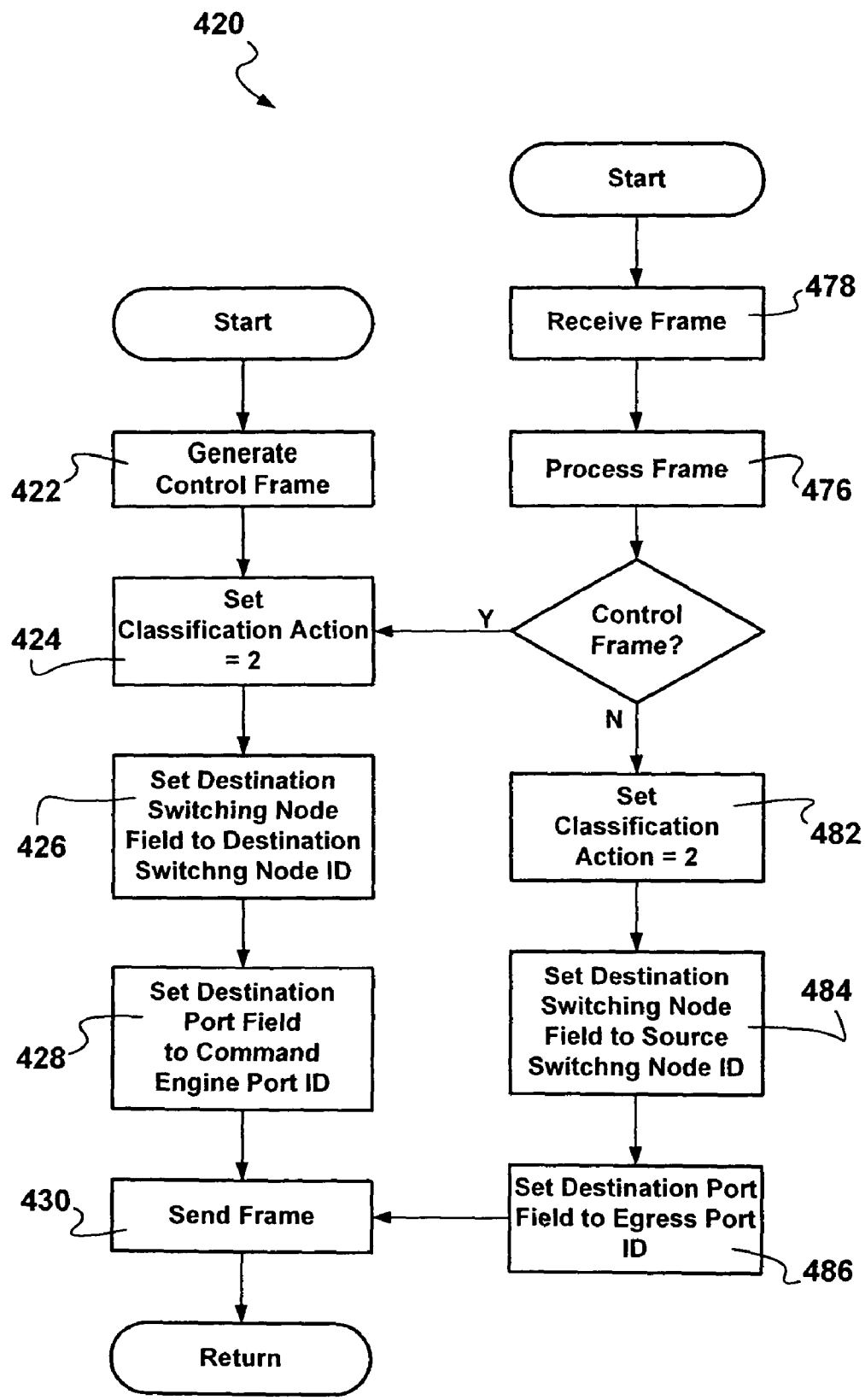
FIG. 4 is a flow diagram showing, in accordance with the exemplary embodiment of the invention, process steps performed by a management processor implementing remote control and configuration in a switching node stack.

Making reference to FIG. 4, the management processor 306 encapsulates 422 the command in a command frame 410, including an FTAG 406. The FTAG 406 has the "classifier action" field set 424, for example, to "2", with the "destination switching node" field set 426 to the switching node ID of the switching node 302 for which the command intended. The "destination port" field is set 428 to a value that has been reserved to indicate the command engine 310 of the intended destination switching node 302. In accordance with an exemplary implementation of the exemplary embodiment of the invention, if no switching node 302 in the stack 300 contains more than 29 physical ports, then a special value "31" may be used in the "destination port" field to signify that the control frame 410 is destined for the command engine 310. And, the command frame 410 is sent 430 to the intended switching node 302.

Figure 5:
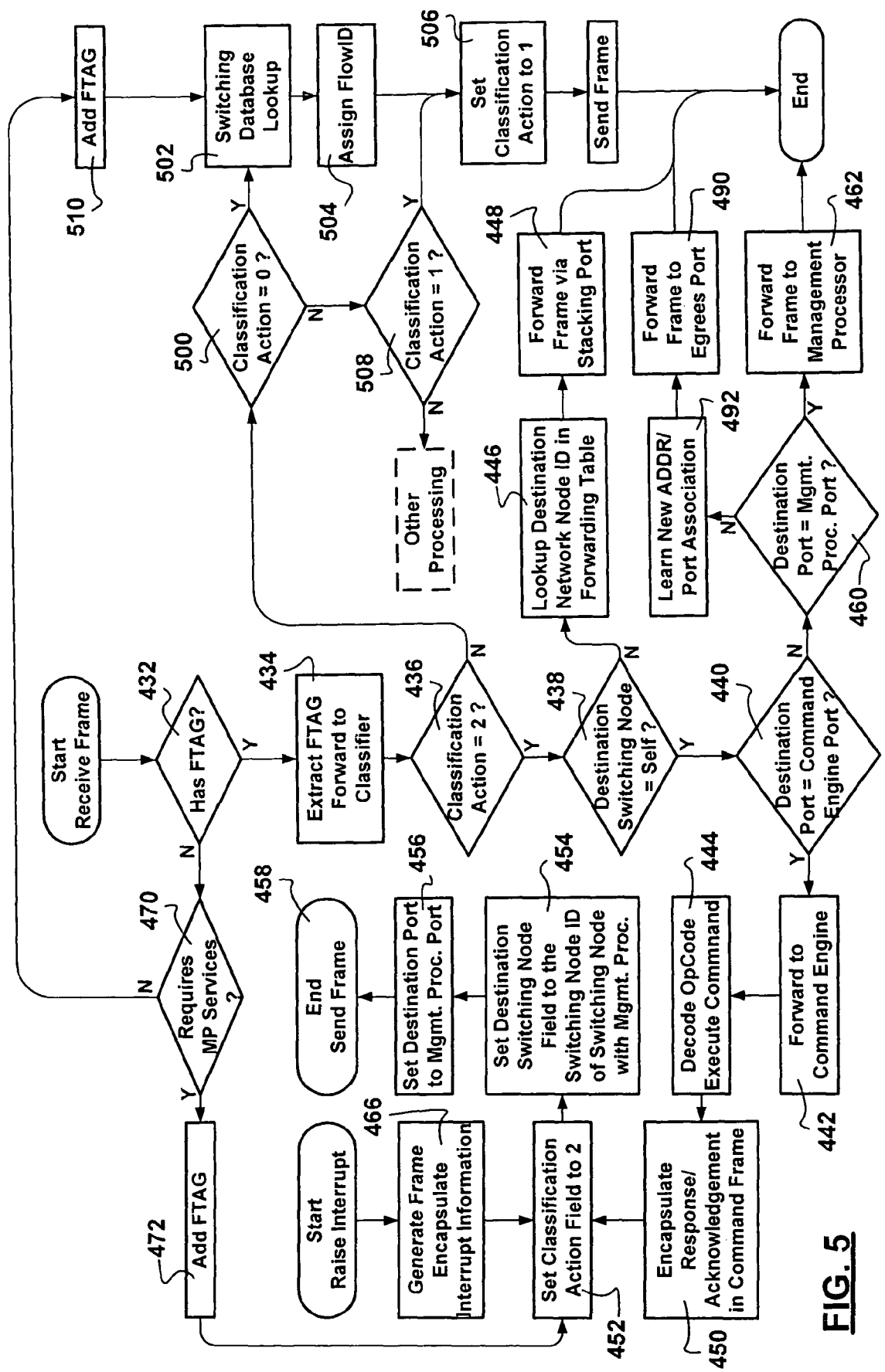
FIG. 5 is a flow diagram showing, in accordance with the exemplary embodiment of the invention, process steps performed by a switching node in a switching node stack remotely controlled and configured by a management processor.

Making reference to FIG. 5, as a command frame 410 traverses a stack 300, at each switching node 302 along the way, the switching node hardware at or near the interface of a stacking port 308, Media Access Control (MAC) module, recognizes 432 the command frame 410, by its FTAG signature. The MAC module extracts 434 the FTAG 406 for use by a classifier of the switching node 302.

A search and classification engine observes 436 that the "classifier action" field specified in the FTAG 406 is set to "2", which means that the control frame's destination, specified in the FTAG 406, will override the results of a database search or classification.

If the search and classification engine of a switching node 302 observes 438 that the "destination switching node" in the FTAG 306 is equal to the switching node ID of the switching node 302 making the determination, then the command frame 410 must be destined for a local port or the local command engine 310. If the "destination port" field is set 440 to the value reserved for the command engine 310, the search and classification engine relays 442 the command frame 410 to the local command engine 310.

Once the command frame 410 is received by the destination command engine 310, the command engine 310 decodes the command by reading and interpreting the opcode and executes 444 the command. Executing 444 a command typically involves interacting with other hardware modules of the switching node 302, where relevant registers or records to be read or updated may be located.

If the search and classification engine observes 438 that the "destination switching node" in the FTAG 406 is not equal to the subject switching node ID, then the command frame 410 must be destined for another switching node 302 in the stack 300. In this case, the search and classification engine consults 446 the forwarding table 350 using the specified destination switching node ID as an index to determine the correct egress stacking port 308 for the control frame 410, and forwards 448 the control frame 410 via the determined stacking port 308.

In accordance with a second scenario the command engine responds to a command from the remote management processor 306.

When the command engine 310 has finished executing a command, the command engine 310 may acknowledge completion, and typically but not necessarily, respond with related information. In acknowledging/responding, the command engine 310 encapsulates 450 a response/acknowledgement in a command frame 410, including an FTAG 406. The FTAG 406 has the "classifier action" field set 452 to "2", with the "destination switching node" field set 454 to the switching node 302 to which the controlling management processor 306 is directly attached. The "destination port" field is set 456 to the management processor port ID. The command engine 310 writes (450) the content of the response frame 410, for example, the data that has been read out from one or more registers.

In accordance with an exemplary implementation of the exemplary embodiment of the invention, overheads related with processing control frames 410 at a switching node 302 are reduced in responding to/acknowledging a control frame 410 sent by the management processor 306, by overwriting the received request control frame 410 already stored at the switching node 302 with the corresponding response control frame 410 as the response control frame 410 is generated 450, assuming that each response control frame 410 is at most as large as the request control frame 410 received.

The acknowledgement/response control frame 410 is then sent 458 via a stacking port 308 as specified in the forwarding table 350. If the acknowledgement/response control frame 410 is destined to the local switching node 302, the acknowledgement/response control frame 410 is understood to be sent 458 via a loopback stacking port and the process continues from step 432.

If the response control frame's "destination switching node" specification specifies 438 the local switching node ID, wherein the local switching node 302 generated the acknowledgement/response control frame 410, and the "destination port" is 460 the port 303 to which the management processor 306 is attached, then the command engine 310 sends 462 the control frame 410 towards the local management processor port 303.

If the response frame's "destination switching node" specification does not specify 438 the local switching node ID, then the controlling management processor 306 is connected to another switching node 302 in the stack 300. In which case, the command engine 310 consults 446 the forwarding table 350 to determine the correct egress stack port 308 for forwarding 448 the response control frame 410 to the switching network node 302 to which the controlling management processor 306 is directly connected.

The response control frame 410 continues to be forwarded 448 through the stack 300, switching node 302 by switching node 302, eventually finding its way to the correct destination switching node 302, as described above with respect to the first scenario. Once at the correct 438 destination switching node 302, the local control engine 310 observes 460 that the "destination port" specified in the FTAG 406 is the management processor port 303 and the acknowledgement/response control frame 410 will be forwarded 462 to the management processor 306.

In accordance with a third scenario the command engine 310 delivers an interrupt towards remote management processor 306.

When any hardware module of a switching node 302 requests a management processor interrupt, the local command engine 310 encodes 466 the interrupt information in a command frame 410 having an FTAG 406. The FTAG 406 has the "classifier action" field set 452 to "2", with the "destination switching node" field set 454 to the switching node ID of the switching node 302 to which the controlling management processor 306 is directly attached. The "destination port" field is also set 456 to the management processor port 303.

Command frame 410 forwarding proceeds as described above in respect of second scenario.

In accordance with a fourth scenario the search/classification engine redirects a frame to the management processor 306.

Under certain conditions, the search/classification engine may redirect 470 a frame 400 to the management processor 306 by including 472 an FTAG 406 into the subject frame 400. For example, if the destination IP address of a Layer-3 frame 400 is not found in the database of the local switching node 302, then the switching node 302 may forward 458 the frame 400 to the management processor 306, which provides routing functionality. In addition, other special types of frames 400, such as Bridge Protocol Data Units (BPDUs) or Spanning Tree Protocol (STP) frames 400, may be trapped by the search/classification engine of the local switching node 302 and forwarded to the management processor 306 for special handling. Once an FTAG 406 is "attached" 472 to such a frame 400, the "classifier action" field of the FTAG 406 is set 452 to "2", with the "destination switching node" field set 454 to the switching node 302 to which the controlling management processor 306 is directly attached. The "destination port" field is also set 456 to the management processor port 303. The forwarding 458 of the modified frame 400 proceeds as described above in respect of the second scenario.

In accordance with a fifth scenario the management processor 306 sends a frame 400 to a remote switching node 302 to be forwarded via a port.

Making reference to FIG. 4, the most common time when a non-command frame 400 is sent from the management processor 306 is after the management processor 306 has resolved 478 a frame's IP address, that is, in response to a frame 400 forwarded 458 to the management processor 306 as described herein above with reference to the fourth scenario. In this case, the management processor 306 modifies 480 FTAG 406 and the payload of the received 476 frame 400 before sending the frame 400 to the remote switching node 302. The "classifier action" field of the FTAG 406 set 482 to "2" and the "destination switching node" and "destination port" fields are set 484/486 to the source switching node ID and the egress port ID based on the resolved IP address.

The forwarding of the frame 400 proceeds as described herein above with reference to the first scenario.

When the frame finally reaches the destination switching node 302, the local search/classification engine identifies 432 and redirects 490 the frame 400 toward the specified egress port. In the process the search/classification engine learns 492 the new destination IP address/egress port association.

Accordingly the five scenarios described herein above, represent in-band configuration and control frame forwarding.

Frames are received via an external port at a switching node 302 and are provided 510 with an FTAG.

In accordance with a sixth scenario, frames 400 are forwarded 458 between staking ports 308 in a stack 300 by performing Layer-2 or Layer-3 database searches 502 at each hop. The "classifier action" field in FTAG 406 of such frames 400 is set 500 to "0". Alternatively, the first-hop switching node 302 may assign 504 the frame 400 a flow ID after classification and store the flow ID in the FTAG 406. By setting 506 "classifier action" to "1", the search/classification engine can force 508 subsequent hops to use the previously assigned flow ID to override the results of local database searches.

Accordingly the above six exemplary scenarios detail frame forwarding in the stack 300.

In accordance with the exemplary embodiment of the invention, an interrupt acknowledgment protocol is provided.

When a single management processor 306 controls multiple switching network nodes 302 in a stack 300 via in-band messages, reliability of the in-band communication channel becomes a critical issue.

As described in respect of the first and the second scenarios above, command engines 310 acknowledge every command frame 410 received, so that the management processor 306 can monitor whether issued commands actually reached their destinations and were executed. If the management processor 306 does not receive an acknowledgment, then it must assume that the command frame 410 was lost, and therefore retransmits the command frame 410.

It is possible that the command was indeed received and executed, while the acknowledgment itself was lost or is delayed. This condition results in the management processor 306 issuing the same command multiple times, causing the remote switching node 302 to accidentally execute such an unacknowledged command multiple times.

Implementations based on the exemplary embodiment described herein should ensure to the extent possible that commands issued by the management processor 306, if executed twice, will be harmless.

Advantageously, most of the commands needed to control and configure switching network nodes 302 in a stack 300 are harmless, examples include reading/writing a register, or switching database updates.

However, recall from the above description, that the command engine 310 generates a command frame 410 whenever a management processor 306 interrupt is required. To ensure a reliable in-band channel, the command engine 310 determines whether each interrupt message actually reaches the management processor 306 by monitoring acknowledgments (410). As described above, the command engine 310 could mistakenly issue the same interrupt twice because of a lost or delayed acknowledgment from the management processor 306, causing the management processor 306 to misinterpret the command engine's intent. Suppose that the management processor 306 receives two interrupt messages from switching node 302-3 closely spaced apart in time, each interrupt message indicating that the "total bytes received on port 7" statistics counter has wrapped around. The management processor 306 may incorrectly determine that this counter actually rolled over twice, when in fact it may simply be the same interrupt message issued two times.

Figure 6:
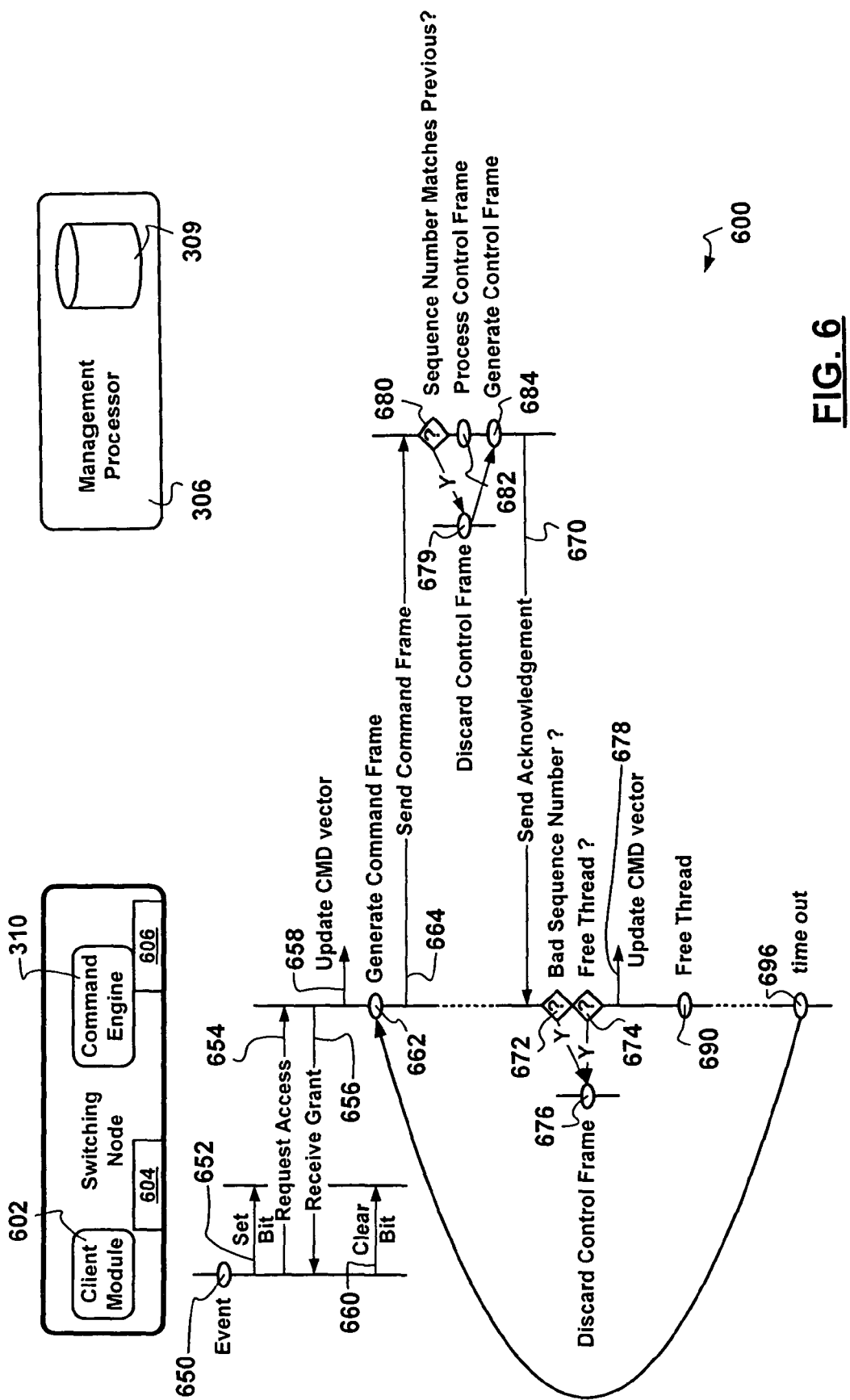
FIG. 6 is a process diagram showing, in accordance with the exemplary embodiment of the invention, steps of an interrupt acknowledgement process.

The ambiguity is addressed, in accordance with the exemplary embodiment of the invention, by employing an interrupt acknowledgment protocol 600 shown in FIG. 6. The interrupt acknowledgement protocol involves three participant entities: the interrupting client module 602 of the associated switching node 302, the associated command engine 310 on the local switching node 302, and the management processor 306. The following terminology will be used herein to describe an exemplary interrupt acknowledgement protocol implementation:

An interrupting client module 602 is a hardware block of a subject switching node 302 in respect of which an interrupt event is initiated. From the above example, when a statistics counter rolls over in the MAC block, the management processor 306 is to be notified. The MAC block behaves as the interrupting client module 602.

Local interrupt vector 604: An interrupting client module 602 may experience several events that trigger a management processor 306 interrupt, the interrupting client module 602 must keep a bitmap which indicates which event or events are being used in triggering the management processor 306. This bitmap, referred to as a local interrupt vector 604, is stored locally at subject switching node 302.

CMD interrupt status vector 606: The command engine 310 maintains an interrupt status vector 606 for each interrupting client module 602 of the subject switching node 302. A client's interrupt request is pending until receipt thereof has been acknowledged by the management processor 306. This pending status is reflected by a logic high "1" in the CMD interrupt status vector 606.

Thread: When an interrupting client module 602 has triggered one or more interrupt events, the command engine 310 formulates and sends a command frame 410 containing the interrupt status for that interrupting client module 620, and then waits for an acknowledgment from the management processor 306. The command engine 310 can serve multiple clients 602 simultaneously; that is, there can be multiple such command frames 410, or their corresponding acknowledgments, in transit at any given time. These multiple parallel operations are referred to as threads. For each thread, a small amount of state information is required to be maintained by the command engine 310 and by the management processor 306.

Sequence number: Command frames 410 and acknowledgments (410) are identified by thread number, and by a sequence number which is incremented by 1 for each command frame 410 sent/acknowledged. The sequence number is contained in the command frame 410 header as shown above. Counters are maintained for each thread.

Correspondingly the management processor 306 tracks CMD interrupt status vector information in a repository 309 associated therewith.

When an interrupt event 650 ensues, the interrupting client module 602 sets 652 the corresponding bit in the corresponding local interrupt vector 604. Interrupt triggering begins with the interrupting client module 602 requesting access 654 to the command engine 310. When access to the command engine is granted 656, the command engine 310 updates 658 the CMD interrupt status vector 606 associated with that interrupting client module 602. In accordance with an exemplary implementation of the exemplary embodiment of the invention, the new CMD interrupt status vector 606 is the bitwise OR of the old vector 606 and the client's local interrupt vector 604. And, the interrupting client module 602 clears 660 its local interrupt vector 604.

Any CMD interrupt status vector 606 that contains a logic high "1" in any bit position requires that a command frame 410 be sent to the management processor 306 on behalf of that interrupting client module 602. In accordance with an exemplary implementation of the invention, the number of active threads represents a managed resource at the switching network node 302, and therefore when one of the multiple threads becomes free, the command engine 310 selects one of the eligible interrupting client modules 602 to used it. For example, the arbitration algorithm used to chose an interrupting client module 602 for service may adhere to a round robin discipline. When the selected thread becomes occupied, the sequence number for the thread is incremented.

The command engine 310 generates 662 a command frame 410, and sends 664 the command frame 410 on behalf of, the interrupting client module 602. The command frame 410 contains the current value of the CMD interrupt status vector 606 (bitmap) for that interrupting client module 602. The command frame 410 is identified by the thread number and by the thread's current sequence number. The thread remains occupied while the command engine 310 waits for an acknowledgment (410).

If an acknowledgment is received 670 for a particular thread, but the acknowledgment's sequence number does not match 672 the value of the thread's sequence counter, or if the thread is free 674, then the command engine 310 ignores the acknowledgment, thus reducing deleterious effects of multiple acknowledgements.

If an acknowledgment (410) is received for an occupied thread, and the acknowledgment's sequence number matches the value on the thread's sequence counter 676, then the acknowledgment is valid. The command engine 310 updates 678 the CMD interrupt status vector 606 associated with the interrupting client module 602. In accordance with the exemplary implementation of the exemplary embodiment of the invention, the new CMD interrupt status vector 606 is the bitwise AND of the old vector and the inverse of the vector contained in the acknowledgment (410). And, the thread is freed.

If no valid acknowledgment 410 is received after a (programmable) timeout period 680, the command engine 310 resumes, undertaking steps to formulate 662 and issue 664 another command frame 410 as described above.

For each thread, the management processor 306 keeps track of the last sequence number received 664 in a control frame 410, as well of the first received interrupt status vector 606 corresponding to that sequence number.

If a command frame 410 is received 664 for a particular thread, and the frame's sequence number does not match 680 the last sequence number received, then the control frame 410 is considered valid. The management processor 306 takes an action 680 based on the value of the interrupt status vector 606 specified in the control frame 410, or rather on the logic high bits specified therein.

The management processor 306 formulates 684, and sends 670, an acknowledgment frame 410. The acknowledgment frame 410 contains the same sequence number as the corresponding command frame 410, and the same interrupt status vector 606 content. The management processor 306 records the received sequence number and command frame contents (payload, in this case the interrupt status vector 606).

If a command frame 410 is received for a thread, and the frame's sequence number matches 679 the last sequence number received, then the control frame 410 is invalid which is a repeat interrupt issued because the acknowledgement 670 of the first triggering of the interrupt did not reach the subject switching node 302. The management processor 306 takes no action with respect to the vector content of the command frame 410. The management processor 306 formulates 684 and sends 670 an(other) acknowledgment frame 410. The acknowledgment contains the same sequence number as the command frame and the previously stored content instead of the content currently present in the invalid command frame 410. The management processor 306 does not record the received sequence number and content.

In the above description the interaction between the management processor 306 and the remote controlled switching nodes 302 in the stack 300 assumed that each switching node 302 in the stack 300 knows its own ID, the ID of the switching node 302 to which the management processor 306 is attached, and the correct stacking port 308 for reaching each switching node 302 in the stack 300—that is, each switching node 302 in the stack 300 is preconfigured with the information stored in the forwarding table 350 and registers 352.

These three pieces of information are provided to each switching node 302 in the stack 300 at initialization. A seemingly vicious circle is apparent: the stack 300 must be initialized in order to configure the stack 300. Because remote control effected by the management processor 306 cannot be performed without the above mentioned three pieces of information—that is, unless the switching nodes 302 are initialized—one might expect that the initialization itself cannot be performed via remote control.

In accordance with the exemplary embodiment of the invention, support for remote switching network node initialization is provided.

In accordance with an exemplary implementation of the exemplary embodiment of the invention, two additional basic elements are employed:

Switching node default ID—Prior to initialization, every switching node 302 in the stack 300 has switching node ID equal to the reserved ID "0". Because "0" is a reserved ID, no switching node 302 in the stack 300 may have its switching node ID equal to 0 during normal operation after initialization.

Port blocking—Every stacking port 308 can be set in either a "blocking state" or a "forwarding state". When a stacking port 308 is in the blocking state, incoming command frames 410 are always sent directly to the local command engine 310. When the stacking port 308 is in the forwarding state, incoming command frames 410 are forwarded based on the information stored in FTAGs 406 and in the forwarding table 350. By default, all stacking ports 308 are in the blocking state.

Figure 7:
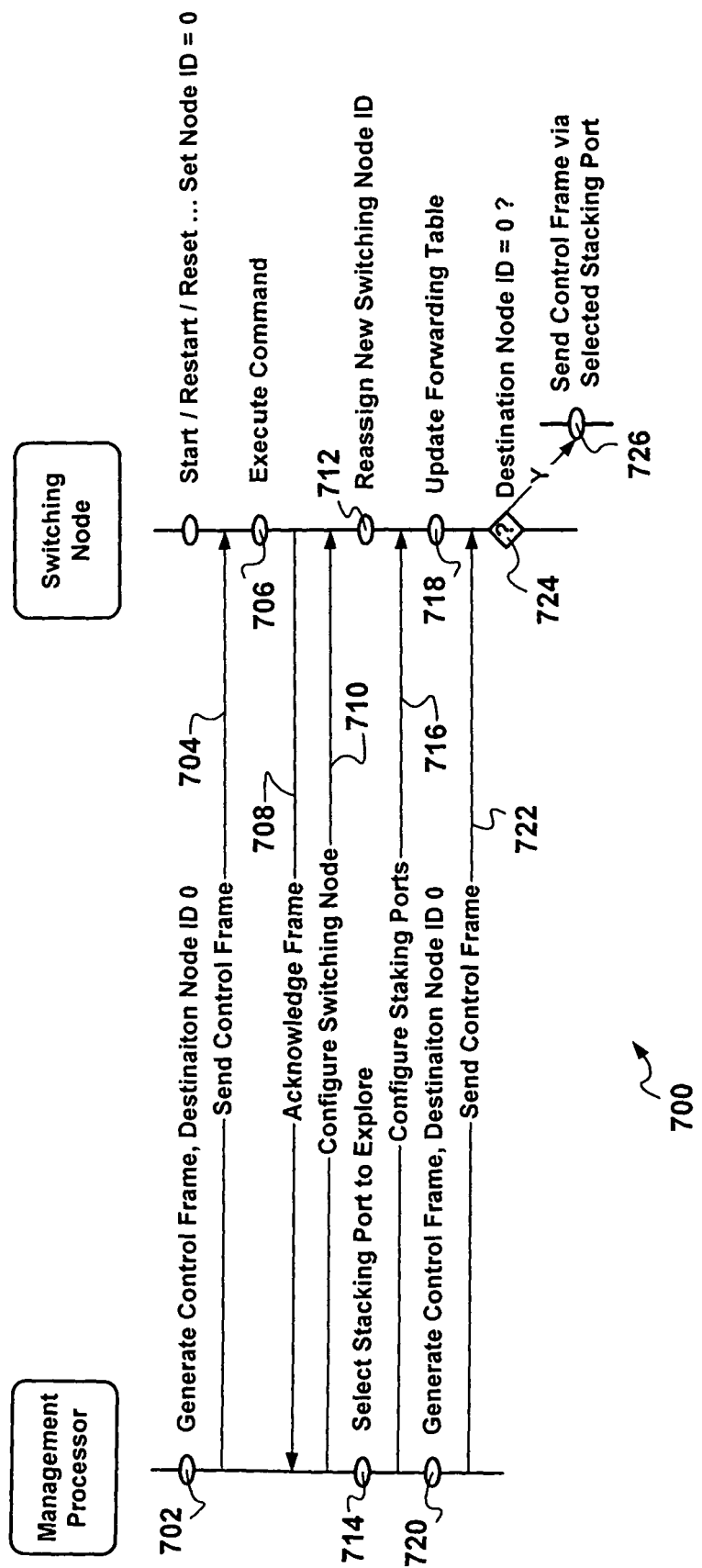
FIG. 7 is a process diagram showing, in accordance with the exemplary embodiment of the invention, a stack initialization process.

In accordance with an exemplary implementation of the exemplary embodiment of the invention, a stack exploration and initialization process 700 is employed using a depth-first search as shown in FIG. 7. A simple account follows:

The management processor 306 begins the initialization process 700 by initializing the switching node 302 closest thereto by generating 702 a command frame 410 having an FTAG 406, with "destination switching node" equal to "0", and "destination port" equal to the command engine's reserved port value. The command frame 410 is sent 704 via a stacking port 308. The search engine of the closest switching node 302 receives 704 the command frame 410 and forwards it to the command engine 310.

The command engine 310 executes 706 the command in the command frame 410 as per the specified opcode. The command engine 310 also acknowledges 708 the command 410, sending 708 the acknowledgment 410 to the local stacking port 308 via which the original command frame 410 arrived (704).

The management processor 306 receives 710 the acknowledgement and thereafter has the necessary information to configure 710 the closest switching node 302 by sending a series of command frames 410. The switching node ID of the closest switching node 302 is reassigned 712 to "1".

Before proceeding further, the management processor 306 selects 714 an outgoing stacking port 308 to explore next. The depth-first search algorithm is applied here. The management processor 306 configures 716/718 the forwarding table 350 of switching node ID 1 to direct frames destined for switching node ID 0 to selected egress port 308.

The management processor 306 again generates 720 and sends 722 a command frame 410 with "destination switching node" equal to "0" and "destination port" equal to the command engine's reserved value. Switching node ID 1, already initialized, detects 724 the control frame 410 intended for switching node 302-0, and transmits 726 the command frame 410 to the selected stacking port 308 previously configured. The next switching node 302 in the stack 300 reachable via stacking port 308 is uninitialized and therefore identifies itself as switching node ID 0 by default. Upon receiving the command frame 410, forwards the frame to the local command engine 310. The configuration of the second switching node 302 in the stack 300 proceeds is a similar manner as the above described configuration of the switching node 302 closest to the management processor 306 culminating in the switching node ID being set to "2".

Configuration of all switching nodes 302 in the stack 300 continues in this manner. The management processor 306 sends a command frame 410 to "switching node ID 0," which is forwarded along by already initialized switching nodes 302, until the first uninitialized switching node 302 is encountered. Then the management processor 306 assigns to the newly encountered switching node 302 a new ID and configures it as needed. In the process, the management processor 306 configures forwarding tables 350 in the configured switching nodes 302, so that the search for the next switching node ID 0 proceeds through a previously unexplored stacking ports 308.

The above described approach nearly solves the problem of stack initialization. FIG. 8 illustrates one remaining problem.

In FIG. 8a), the management processor 306 has already initialized switches 302-1, 302-2, and 302-3. When the management processor 306 attempts to discover a fourth switching node 302, it generates a command frame 410 having an FTAG with "destination switching node" equal to "0", as described. Before sending this command frame 410, the management processor 306 configures the forwarding tables in 302-1, 302-2, and 302-3 to relay command frames 410 destined for switching node ID 0 along the path shown in heavy lines.

FIG. 8b) illustrates what happens if switching node 302-3 is actually connected back to switching node 302-1, forming a loop as desired in a ring 104 type switching node stack 100 described above. In this case, the command frame 410 destined for switching node ID 0 will be relayed round and round the stack 300 in search for an un-configured switching node 302 that does not exist. Seemingly, no switching node 302 can break the cycle, because each switching node 302 in the ring 104 was configured by the management processor 302 to forward any such command frames 410 along and therefore behaving as configured.

Loop detection is a critical aspect of topology discovery. In accordance with the exemplary implementation, a simple method for detecting and resolving loops is illustrated in FIG. 9. Before forwarding a command frame 410 over an unexplored stacking port 308, the management processor 306 configures 902 all stacking ports 308 that are not part of the exploration path as blocking ports, and configures 904 stacking ports 308 in the exploration path as forwarding ports.

Therefore, when the command frame 410 loops back to switching node 302-1, it arrives on a blocking port (308), and is immediately forwarded to the local command engine 310 as described herein above. The local command engine 310 executes the command and sends an acknowledgment back to the management processor 306. The management processor 306 receives the acknowledgment, and from the "source switching node" field in the FTAG 406, observes that the acknowledgment (410) is coming from switching node ID 1, not from switching node ID 0 which signals discovery of a loop in the topology.

Figure 10:
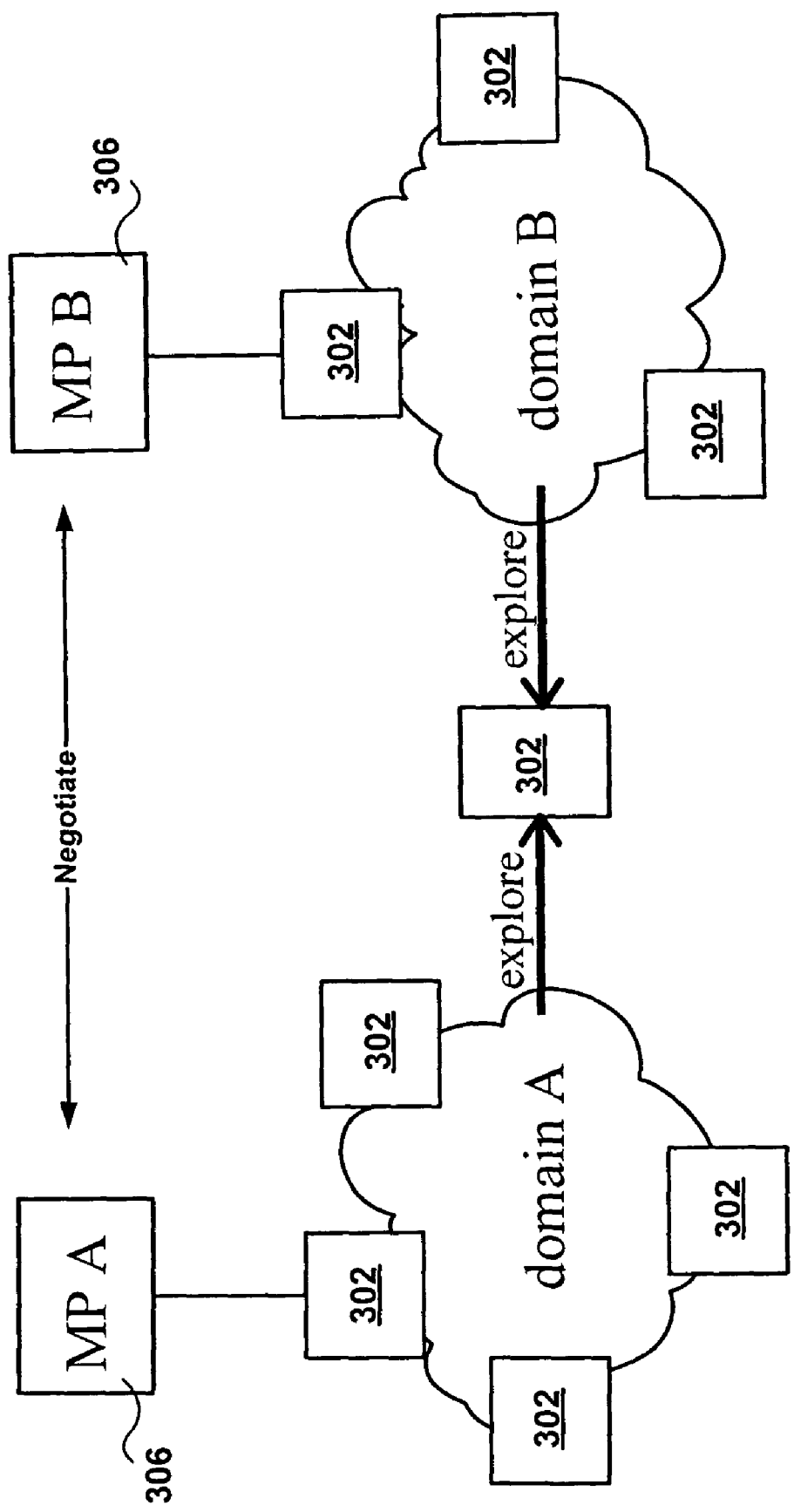
FIG. 10 is a schematic diagram showing, in accordance with the exemplary embodiment of the invention, multiple control and configuration domains in a stack, each domain having an associated management processor.

In the above, the invention has been described in respect of a single stack 300 of switching nodes 320 managed by a single management processor 306. In order to implement specific applications and/or for example to provide load sharing, a stack of switching nodes 302 may be controlled by two or more management processors 306 as shown in FIG. 10. As long as each switching node 302 has knowledge of the location of its own controlling management processor 306, the methods and algorithms described above apply with no modification. Each management processor 306 and the corresponding managed switching nodes 302 form a management domain. Stack exploration and initialization is still largely the same, departures therefrom are best explained with reference to FIG. 10.

In FIG. 10, management processor 306-A and management processor 306-B both initialize their own domains as described above. A clash occurs when both management processor try to initialize the same switching node 302-S. To address the clash, suppose that management processor 306-A initializes switching node 302-S first. When management processor 306-B tries to re-initialize the switching node 302-S by sending it a command frame 410, the command engine 310 of switching node 302-S will send the corresponding acknowledgment back to management processor 302-A because management processor 306-A is the controlling management processor 306 of switching node 302-S in accordance with the then current configuration. The management processor 302-A recognizes the clash when the management processor 302-A receives an acknowledgment for a command frame 410 that it never sent. Following the receipt of such an acknowledgement, management processors 306-A and 306-B communicate directly and negotiate which switching nodes will be controlled by each.

The embodiments presented are exemplary only and persons skilled in the art would appreciate that variations to the above described embodiments may be made without departing from the spirit of the invention. The scope of the invention is solely defined by the appended claims.

We claim:

1. A switching network node of a plurality of switching network nodes participating in a switching network node stack comprising:
    a. at least one stacking port for exchanging frames with at least one other switching node in the stack;
    b. a switching node identification register for specifying switching node identification of the switching node;
    c. a management node identification register for specifying the switching node identifier of the switching node of the plurality of switching nodes in the stack to which a management processor is attached;
    d. a forwarding table for specifying, for each switching node in the stack, a corresponding stacking port via which to forward frames towards said switching node; and
    e. a command engine configured to initiate a command frame to interrupt the management processor if the management processor is attached to another switching network node among the plurality of switching network nodes, wherein control frame information within the command frame indicates whether the command engine or the management processor initiated the command frame.

2. The switching node claimed in claim 1, wherein the stack has one of a single ring, multiple ring, and star topology.

3. The switching node claimed in claim 1, wherein each stacking port has a state specification register for setting the stacked port in one of a forwarding state and a blocking state.

4. The switching node claimed in claim 1, further comprising a classification engine selectively discriminating between control frames, and data frames.

5. The switching node claimed in claim 1, further having a management port for connection to the management processor.

6. The switching node claimed in claim 1, further comprising:
    a. a plurality of local external ports for receiving a data frame to be processed by the plurality of a switching nodes in the stack;
    b. a switching database for storing switching information regarding which network address can be reached via a corresponding external local port of the plurality of switching nodes in the stack;
    c. a search engine for selectively determining via which one of the plurality of local external ports to forward the data frame; and
    wherein the command engine is further configured to selectively embed a frame stacking tag (FTAG) in the data frame for forwarding the data frame in the stack if the data frame is selected from one of: a frame for which an external port was not determined by the search engine and a frame for which the determined external port is associated with another switching node in the stack.

7. The switching node claimed in claim 1, further comprising:
    at least one module for performing actions associated with processing frames at the switching node including one of raising an interrupt and generating a response; and
    wherein the command engine is further configured to generate the command frame to be sent to the management processor in response to the raising of the interrupt, for executing commands encapsulated in a received control frame, and for acknowledging the received control frame.

8. The switching node claimed in claim 7, wherein the module further comprises a local interrupt vector for tracking a plurality of interrupting events associated with the module.

9. The switching node claimed in claim 7, further comprising a command interrupt status vector for tracking a plurality of interrupting events generated by the switching node.

10. A method of discovering one or more switching network nodes in a stack of switching network nodes, comprising:
    defining an exploration path comprising unexplored stacking ports;
    configuring stacking ports not part of the exploration path as blocking ports and configuring stacking ports in the exploration path as forwarding ports;

transmitting a command frame specifying a destination switching node having a reserved identification value;

in response to the command frame looping back to a previously-explored stacking port in the exploration path, performing the steps of:

forwarding the command frame to a local command engine configured to execute a command specified by the command frame; and sending an acknowledgement back to a management processor;

receiving an acknowledgement from the switching node specifying the reserved identification value from one or more newly discovered switching nodes;

configuring the switching node identifier of the one or more newly discovered switching nodes to a unique identification value different from the reserved identification value; and retrieving stacking port identifiers from the one or more newly discovered configured switching nodes.

11. The method of discovery claimed in claim 10, further comprising configuring the forwarding table of the newly discovered switching node in the stack.

12. The method of discovery claimed in claim 10, further comprising configuring a switching database of the newly discovered switching node in the stack.

13. A method of processing frames at a switching network node in a stack of switching network node comprising:

selectively forwarding a received frame based on switching information stored in a switching database associated with the switching node if the received frame bears a classification action value other than a classification action value reserved for control frames, wherein forwarding the frame based on switching information held in the switching database further comprises:

modifying a destination switching node field associated with the frame to specify a resolved destination switching node in the stack; and modifying a destination port field associated with the frame to specify a resolved external egress port of the resolved destination switching node specified in the destination switching node field;

selectively forwarding a received frame based on switching information stored in a forwarding table associated with the switching node if the received frame bears a classification action value reserved for control frames;

based on a location of the management processor, modifying a destination switching node field associated with the frame to specify a switching node in the stack to which a management processor is connected and modifying a destination port field associated with the frame to specify a management port to which the management processor is attached at the destination switching node; and selectively changing the classification action value of the received frame to the classification action value reserved for control frames for each frame requiring management processor services.

14. The method claimed in claim 13, further comprising:

receiving a frame bearing the classification action value reserved for control frames and bearing the identifier of an external egress port in a destination port field associated with the frame; and updating the switching database with an association between the destination network address specified in a frame header and the specified external egress port identifier.

15. The method claimed in claim 13, further comprising:

receiving a frame bearing the classification action value reserved for control frames, bearing the identifier of a local switching node, and bearing a destination port identifier reserved for a command engine;

executing a command specified in the frame; and acknowledging the receipt of the frame.

16. The method claimed in claim 15, further comprising encapsulating a response derived from the execution of the command into the acknowledgement frame.

17. The method claimed in claim 13, further comprising determining that a frame requires management processor services if the destination address specified in the frame cannot be resolved based on the switching information specified in the switching database.

* * * * *